US006981253B2

(12) United States Patent
Asada et al.

(10) Patent No.: US 6,981,253 B2
(45) Date of Patent: Dec. 27, 2005

(54) INFORMATION PROCESSING APPARATUS AND METHOD, RECORDING MEDIUM, STORAGE MEDIUM, AND PROGRAM

(75) Inventors: Tomoji Asada, Tokyo (JP); Sunao Yoshida, Tokyo (JP)

(73) Assignee: Sony Corporation, (JP)

( * ) Notice: Subject to any disclaimer, the term of this patent is extended or adjusted under 35 U.S.C. 154(b) by 597 days.

(21) Appl. No.: 10/060,471

(22) Filed: Jan. 30, 2002

(65) Prior Publication Data

US 2002/0116701 A1 Aug. 22, 2002

(30) Foreign Application Priority Data

Jan. 30, 2001 (JP) ............................ P2001-021083

(51) Int. Cl.[7] ............................................. G06F 9/445
(52) U.S. Cl. ...................... 717/178; 717/169; 717/173; 717/175
(58) Field of Search ................................ 717/168–178; 711/4, 115

(56) References Cited

U.S. PATENT DOCUMENTS 5,764,992 A * 6/1998 Kullick et al. .............. 717/170
6,564,370 B1 * 5/2003 Hunt ........................... 717/122
6,789,255 B1 * 9/2004 Pedrizetti et al. ........... 717/169

FOREIGN PATENT DOCUMENTS

JP 11-234580 8/1999

OTHER PUBLICATIONS

Microsoft, "Introducing Microsoft Windows 95 For Distribution with a new PC only", Microsoft Corporation, pp. 1-9, 19-31, 62-63, 1996.*
Araki, "The Memory Stick", IEEE, pp. 40-46, 2000.*

* cited by examiner

Primary Examiner—Ted T. Vo
(74) Attorney, Agent, or Firm—Lerner, David, Littenberg, Krumholz & Mentlik, LLP

(57) ABSTRACT

The present invention is directed to software downloading by use of a storage medium. If a semiconductor memory has been loaded when the power is turned on, the CPU determines whether the root directory of the semiconductor memory has a desired directory and, if this directory is found, whether software having a predetermined extension exists in this directory. If the software is found in the directory, namely, if the software to be downloaded is found, the CPU downloads this software from the semiconductor memory.

17 Claims, 11 Drawing Sheets

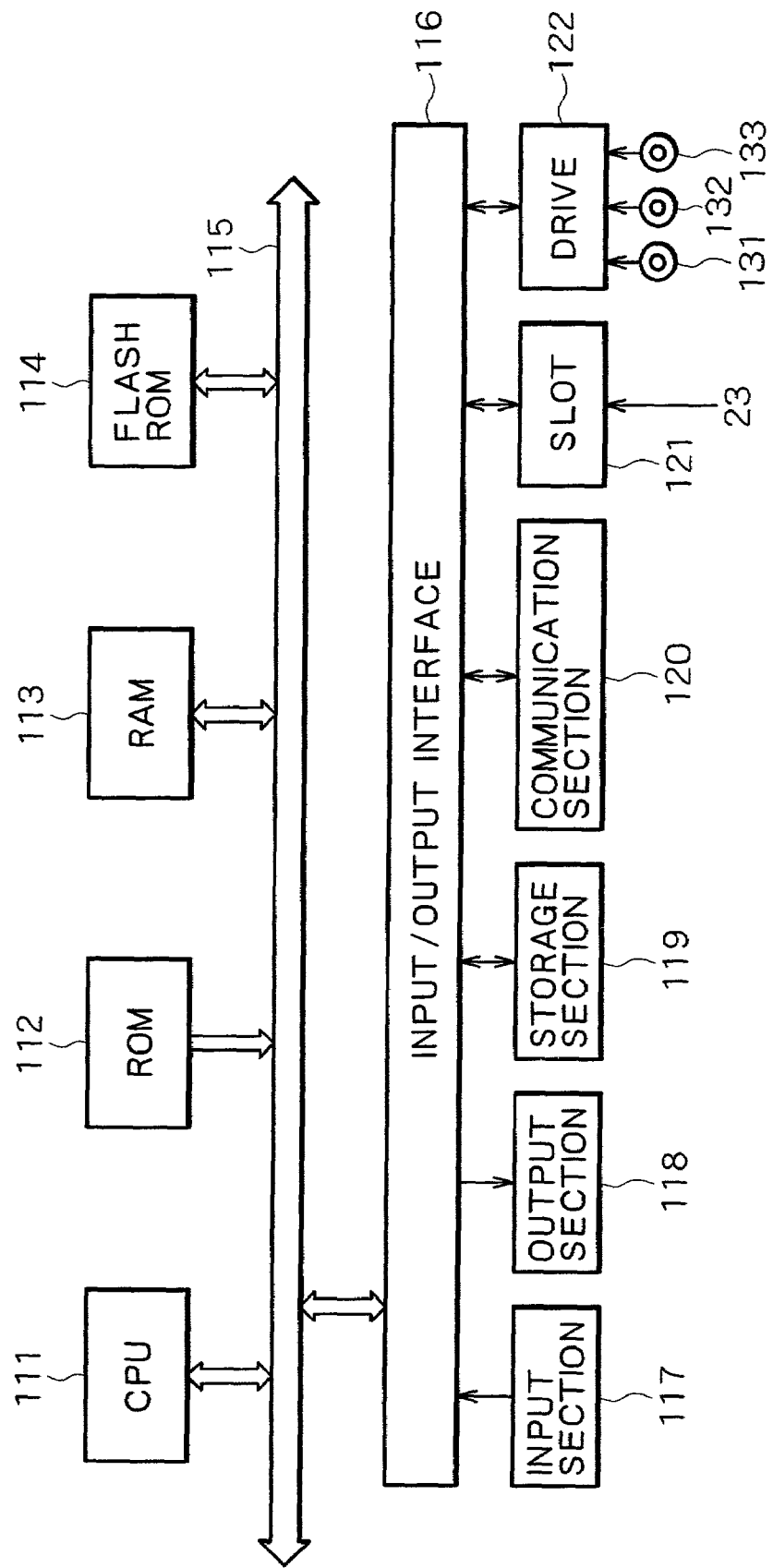

INFORMATION PROCESSING APPARATUS AND METHOD, RECORDING MEDIUM, STORAGE MEDIUM, AND PROGRAM

CROSS-REFERENCE TO RELATED APPLICATIONS

The present application claims priority from Japanese Application No. P2001-021083 filed Jan. 30, 2001, the disclosure of which is hereby incorporated by reference herein.

BACKGROUND OF THE INVENTION

The present invention relates generally to an information processing apparatus and method, a recording medium, a storage medium, and a program and, more particularly, to an information processing apparatus and method, a recording medium, a storage medium, and a program which are adapted to download software by use of storage media.

The applicant hereof proposed, in Japanese Patent Laid-open No. Hei 11-234580, the addition and extension of receiver capabilities by loading storage media storing a browser and other necessary programs or data into a receiver to capture the programs or data therein.

However, the disclosed technology can rewrite programs and data recorded in a receiver but cannot download programs and write programs depending on their versions. Namely, the disclosed technology cannot add new capabilities.

Recently, software downloaded via a satellite is updated. However, in this updating, troubles caused in downloading may prevent the updating from being completed correctly. If this happens, the software involved must be downloaded again via a satellite, resulting in complicated manipulations.

SUMMARY OF THE INVENTION

It is therefore an object of the present invention to provide an information processing apparatus and method, a recording medium, a storage medium, and a program which allow the reliable updating and downloading of software by use of storage media.

In carrying out the invention and according to a first aspect thereof, there is provided a first information processing apparatus to which specified software is downloaded from a storage medium, including a first determination unit operable to determine whether a predetermined directory exists in the storage medium; a second determination unit operable to determine, if the directory exists in the storage medium, whether the specified software exists under the directory; and an execution unit operable to download the specified software from the storage medium if the software exists under the directory.

Preferably, the above-mentioned first information processing apparatus further includes a third determination unit operable to determine whether the storage medium is loaded in the information processing apparatus.

Preferably, the above-mentioned first information processing apparatus further includes a controller operable to activate different software previously stored in the information processing apparatus if the directory does not exist in the storage medium or if the specified software does not exist under the directory.

Preferably, the above-mentioned first information processing apparatus further includes a third determination unit operable to determine whether the specified software is for forced downloading if the specified software exists under the directory.

In the above-mentioned first information processing apparatus, if the specified software is for forced downloading, the execution unit may download the specified software regardless of a version thereof.

Preferably, the specified software has a version, and the above-mentioned first information processing apparatus further includes a checking unit operable to check the version of the specified software if the specified software is not for forced downloading.

In the above-mentioned first information processing apparatus, if the version of the specified software is newer than a version of previously stored corresponding software, the execution unit may download the specified software.

In the above-mentioned first information processing apparatus, if the version of the software is not newer than a version of previously stored corresponding software, a message is displayed indicating that the specified software need not be downloaded.

Preferably, the specified software has a version, and the above-mentioned first information processing apparatus further includes a checking unit operable to check the version of the specified software if the specified software exists under the directory.

Preferably, the above-mentioned first information processing apparatus further includes a third determination unit operable to determine whether the specified software has been downloaded successfully; and a display controller operable to display a message based on a result of the determination by the third determination unit.

In the above-mentioned first information processing apparatus, if other software corresponding to the specified software previously has been stored in the information processing apparatus, the execution unit may rewrite the other software with the specified software.

In the above-mentioned first information processing apparatus, the storage medium may be a rewritable memory.

In carrying out the invention and according to a second aspect thereof, there is provided a first method for processing information in an information processing apparatus into which specified software is downloaded from a storage medium, including determining whether a predetermined directory exists in the storage medium; determining, if the directory exists in the storage medium, whether the specified software exists under the directory; and downloading the specified software from the storage medium if the specified software exists under the directory.

In carrying out the invention and according to a third aspect thereof, there is provided a first storage medium storing a computer-readable program for controlling an information processing apparatus into which specified software is downloaded from a storage medium, the program including determining whether a predetermined directory exists in the storage medium; determining, if the directory exists in the storage medium, whether the specified software exists under the directory; and downloading the specified software from the storage medium if the specified software exists under the directory.

In carrying out the invention and according to a fourth aspect thereof, there is provided a first computer-readable program for causing a computer into which specified software is downloaded from a storage medium to execute the steps of determining whether a predetermined directory exists in the storage medium; determining, if the directory exists in the storage medium, whether the specified software exists under the directory; and downloading the specified software from the storage medium if the specified software exists under the directory.

According to the first information processing apparatus, the first information processing method, and the first program, whether or not a predetermined directory exists in the storage medium is determined and whether or not specified software exists under the predetermined directory is determined. In accordance with the determination results, the specified software is downloaded from the storage medium. Consequently, the specified software can be upgraded or forcibly downloaded by use of the storage medium.

In carrying out the invention and according to a fifth aspect thereof, there is provided a first storage medium storing specified software to be downloaded into an information processing apparatus, the storage medium holding a predetermined directory and storing the specified software under the directory using a name and a predetermined extension attached to the name.

Preferably, the above-mentioned first storage medium is a rewritable memory.

In the above-mentioned first storage medium, the specified software is stored under the directory using a name having a predetermined extension attached to the name. Consequently, the specified software can be upgraded or forcibly downloaded.

In carrying out the invention and according to a sixth aspect thereof, there is provided a second information processing apparatus into which specified software is downloaded from a storage medium, including a first determination unit operable to determine whether a first directory exists in the storage medium; a second determination unit operable to determine, if the first directory exists in the storage medium, whether a second directory exists under the first directory; a third determination unit operable to determine, if the second directory exists under the first directory, whether the specified software exists under the second directory; and an execution unit operable to download the specified software from the storage medium if the specified software exists under the second directory.

Preferably, the above-mentioned second information processing apparatus further includes a fourth determination unit operable determine whether the storage medium is loaded in the information processing apparatus.

Preferably, the above-mentioned second information processing apparatus further includes a controller operable to activate different software previously stored in the information processing apparatus if the first directory does not exist in the storage medium, if the second directory does not exist under the first directory, or if the specified software does not exist under the second directory.

Preferably, the above-mentioned second information processing apparatus further includes a fourth determination unit operable to determine whether the specified software is for forced downloading.

In the above-mentioned second information processing apparatus, if the specified software is for forced downloading, the execution unit may download the specified software regardless of a version thereof.

Preferably, the specified software has a version, and the above-mentioned second information processing apparatus further includes a checking unit operable to check the version of the specified software if the specified software is not for forced downloading.

In the above-mentioned second information processing apparatus, if the version of the software is newer than a version of previously stored corresponding software, the execution unit may download the specified software.

In the above-mentioned second information processing apparatus, if the version of the specified software is not newer than a version of previously stored corresponding software, a message may be displayed indicating that the specified software need not be downloaded.

Preferably, the specified software has a version, and the above-mentioned second information processing apparatus further includes a checking unit operable to check the version of the specified software if the specified software exists under the first directory.

Preferably, the above-mentioned second information processing apparatus further includes a fourth determination unit operable to determine whether the specified software has been downloaded successfully; and a display controller operable to display a message based on a result of the determination by the fourth determination unit.

In the above-mentioned second information processing apparatus, if other software corresponding to the specified software previously has been stored in the information processing apparatus, the execution unit may rewrite the other software with the specified software.

In the above-mentioned second information processing apparatus, the first directory may have a name indicating a device ID of the information processing apparatus and the second directory may have a name indicating a function ID of the specified software.

In the above-mentioned second information processing apparatus, the storage medium may be a rewritable memory.

In carrying out the invention and according to a seventh aspect thereof, there is provided a second method for processing information in an information processing apparatus into which specified software is downloaded from a storage medium, including determining whether a first directory exists in the storage medium; determining, if the first directory exists in the storage medium, whether a second directory exists under the first directory; determining, if the second directory exists under the first directory, whether the specified software exists under the second directory; and downloading the specified software from the storage medium if the specified software exists under the second directory.

In carrying out the invention and according to an eighth aspect thereof, there is provided a second storage medium storing a computer-readable program for controlling an information processing apparatus into which specified software is downloaded from a storage medium, the program including determining whether a first directory exists in the storage medium; determining, if the first directory exists in the storage medium, whether a second directory exists under the first directory; determining, if the second directory exists under the first directory, whether the specified software exists under the second directory; and downloading the specified software from the storage medium if the specified software exists under the second directory.

In carrying out the invention and according to a ninth aspect thereof, there is provided a second computer-readable program for causing a computer into which specified software is downloaded from a storage medium to execute the steps of determining whether a first directory exists in the storage medium; determining, if the first directory exists in the storage medium, whether a second directory exists under the first directory; determining, if the second directory exists under the first directory, whether the specified software exists under the second directory; and downloading the specified software from the storage medium if the specified software exists under the second directory.

According to the second information processing apparatus, the second information processing method, and the second program, whether or not the first directory exists in the storage medium is determined, whether or not the second directory exists under the first directory is determined, and whether or not the specified software exists under the second directory is determined. On the basis of the determination results, the specified software is downloaded from the storage medium. Consequently, the specified software can be upgraded or forcibly downloaded by use of the storage medium.

In carrying out the invention and according to a tenth aspect thereof, there is provided a second storage medium storing specified software to be downloaded into an information processing apparatus, the storage medium holding a first directory and a second directory under the first directory and storing the specified software under the second directory.

In the above-mentioned second storage medium, the first directory may have a name indicating a device ID of the information processing apparatus and the second directory may have a name indicating a function ID of the specified software.

Preferably, the above-mentioned second storage medium is a rewritable memory.

The above-mentioned second storage medium holds the first directory and the second directory under the first directory and stores the specified software under the second directory. Consequently, the specified software can be upgraded or forcibly downloaded.

BRIEF DESCRIPTION OF THE DRAWINGS

These and other objects of the invention will be seen by reference to the description, taken in connection with the accompanying drawing, in which:

FIG. 13 is a block diagram illustrating an exemplary configuration of a computer.

DETAILED DESCRIPTION

This invention will be described in further detail by way of example with reference to the accompanying drawings.

Figure 1:
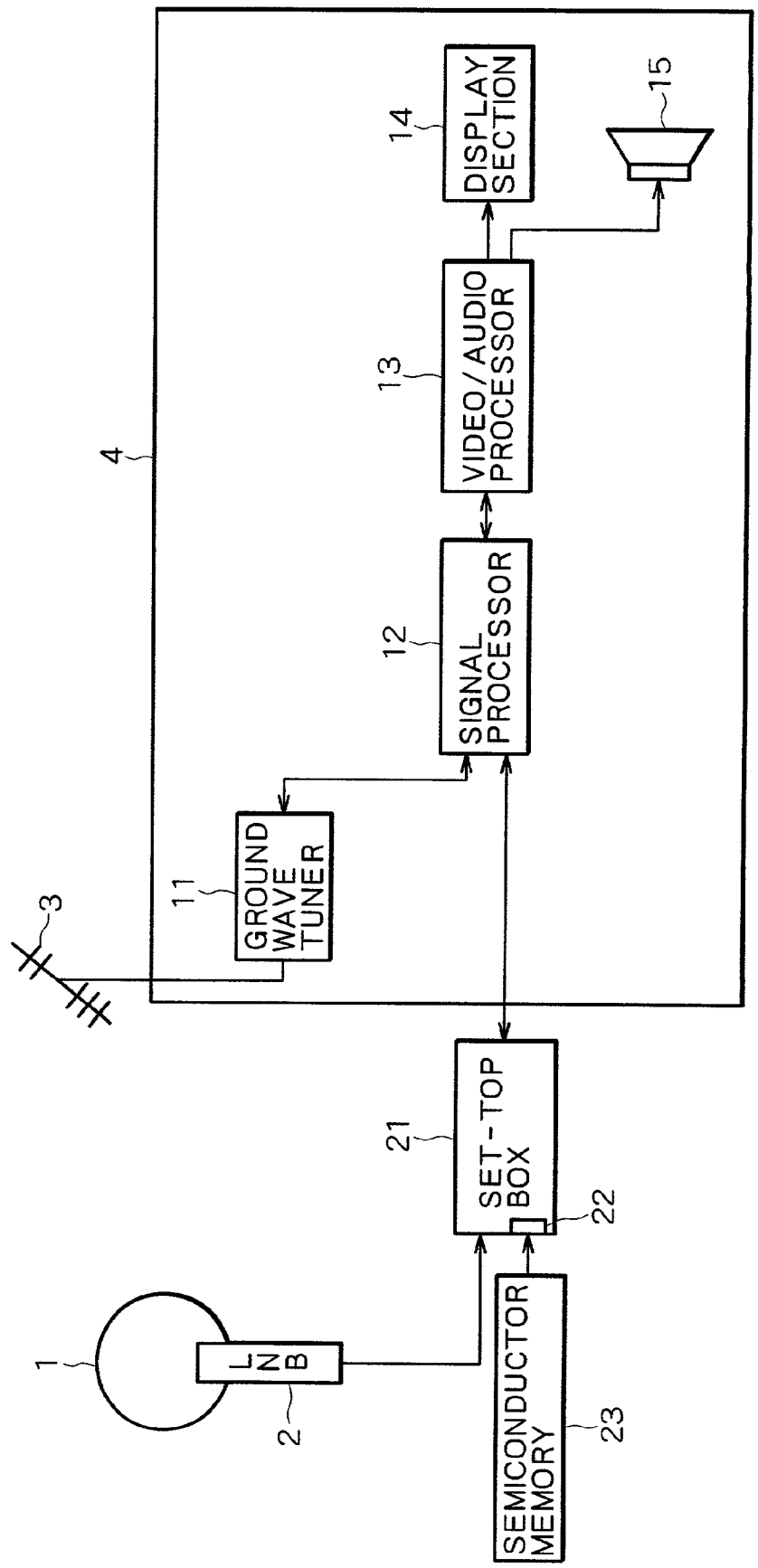
FIG. 1 is a block diagram illustrating an exemplary configuration of a digital television receiver practiced as one embodiment of the present invention.

Now, referring to FIG. 1, there is shown a block diagram illustrating an exemplary configuration of a digital television receiver practiced as one embodiment of the invention. A set-top box 21 is connected to a digital television receiver 4.

A parabola antenna 1 has an LNB (Low Noise Block downconverter) 2 to convert a signal received from an artificial satellite (a broadcasting satellite or a communication satellite) into a signal having a predetermined frequency (an RF (Radio Frequency) signal) and supplies the RF signal to the set-top box 21.

The set-top box 21 demodulates a signal of a predetermined channel from the RF signal supplied from the LNB 2 of the parabola antenna 1 and supplies the demodulated signal to a signal processor 12 of the digital television receiver 4. The set-top box 21 is arranged with a slot 22 for loading a semiconductor memory 23 consisting of a Memory Stick (trademark), for example.

The Memory Stick, developed by the applicant hereof, is a kind of flash memory card. The Memory Stick incorporates a flash memory element, one kind of EEPROM (Electrically Erasable and Programmable Read Only Memory), which is a nonvolatile memory being electrically rewritable and erasable, housed in a plastic case having dimensions of 21.5 mm×50 mm×2.8 mm. The Memory Stick allows writing and reading of various data such as images, voices, and music via a 10-pin terminal.

The ground wave tuner 11 of the digital television receiver 4 generates a video intermediate frequency signal from a ground wave signal received at a ground wave antenna 3 and supplies the generated signal to the signal processor 12.

The signal processor 12 controls the transmission and reception of video and audio signals and control data for controlling the video and audio signals supplied from the set-top box 21 and controls peripheral circuits of the digital television receiver 4. It should be noted that the signal processor 12 is divided into a digital block and an analog block (neither shown).

A video/audio processor 13 performs predetermined signal processing on a video signal supplied from the signal processor 12 to output the resultant video signal to a display section 14. Also, the video/audio processor 13 performs predetermined signal processing on an audio signal supplied from the signal processor 12 to output the resultant audio signal to a speaker 15. It should be noted that the video/audio processor 13 is also divided into a digital block and an analog block (neither shown).

The display section 14 displays the video signal supplied from the video/audio processor 13. The speaker 15 reproduces the audio signal supplied from the video/audio processor 13.

Figure 2:
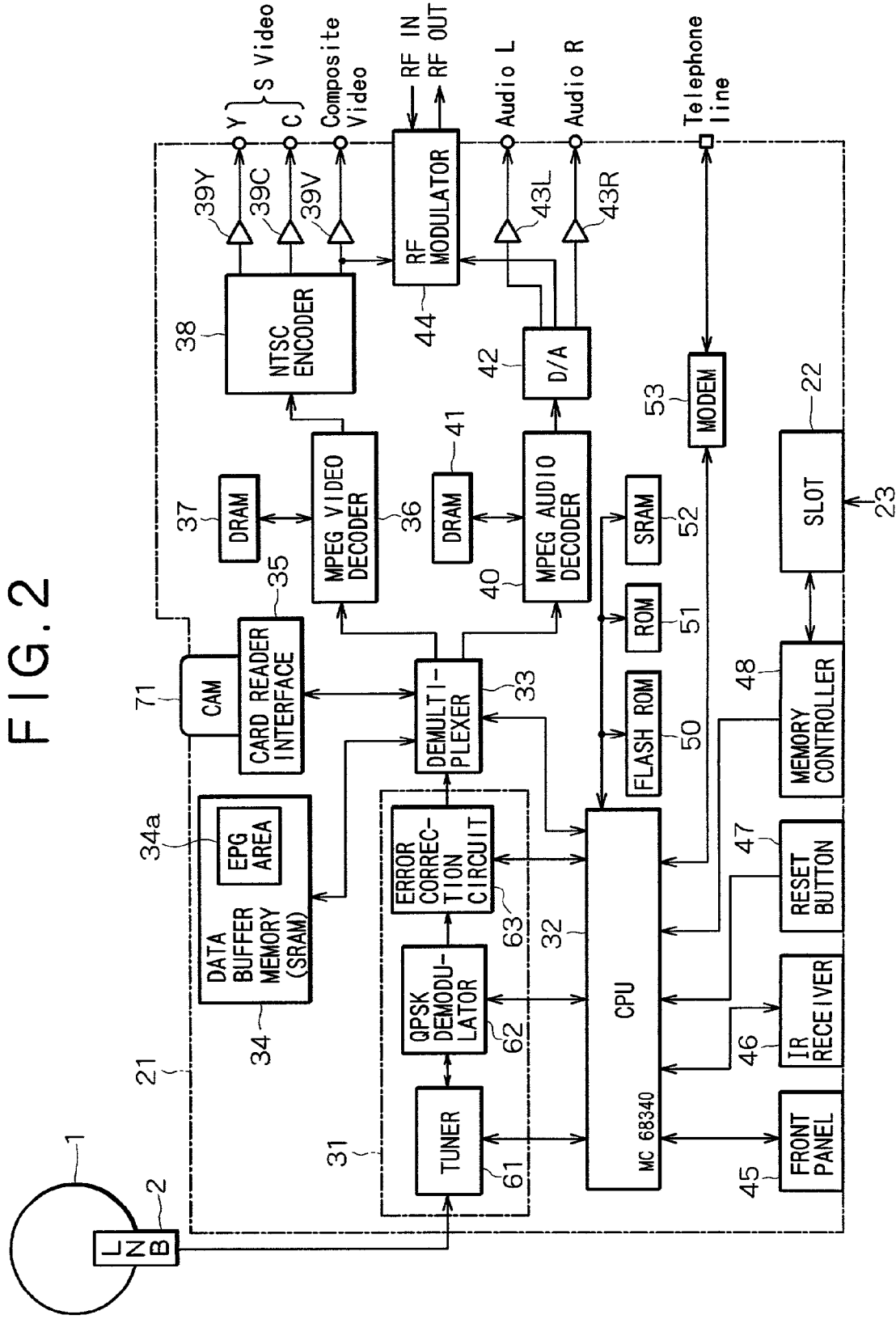
FIG. 2 is a block diagram illustrating an exemplary internal configuration of the set-top box shown in FIG. 1.

Referring to FIG. 2, there is shown a block diagram illustrating an exemplary internal configuration of the set-top box 21.

A tuner 61 of a front end 31 demodulates the RF signal output from the LNB 2 of the parabola antenna 1 and supplies the demodulated signal to a QPSK (Quadriphase Shift Keying) demodulator 62. The QPSK demodulator 62 demodulates, in a QPSK manner, the signal demodulated by the tuner 61 and supplies the demodulated signal to an error correction circuit 63. The error correction circuit 63 performs error correction on the QPSK-demodulated signal and compensation, if necessary.

A CAM (Conditional Access Module) 71 consists of an IC card including a CPU (Central Processing Unit), a ROM (Read Only Memory), and RAM (Random Access Memory) and stores a key necessary for decryption along with a decryption program. Namely, because signals transmitted via a satellite are encrypted, an encryption key and decryption processing are required for decrypting these signals. Therefore, the encryption key is read from the CAM 71 via a card reader interface 35 and supplied to a demultiplexer 33.

It should be noted that the CAM 71 stores fee-charge information, for example, in addition to the key and decryption program for decryption processing.

The demultiplexer 33 decrypts an encrypted signal of a predetermined broadcast channel supplied from the error correction circuit 63 of the front end 31 by use of the key read from the CAM 71 via the card reader interface 35. The demultiplexer 33 temporally stores the decrypted signal in a data buffer memory (SRAM (Static RAM)) 34. Then, on the basis a command from the CPU 32, the demultiplexer 33 reads the decrypted signal from the data buffer memory 34, outputting the video signal to an MPEG (Motion Picture Experts Group) video decoder 36 and the audio signal to an MPEG audio decoder 40.

Also, the demultiplexer 33 captures EPG (Electronic Program Guide) data in addition to the video and audio signals supplied from the front end 31 and stores the captured EPG data in an EPG area 34a of the data buffer memory 34. The EPG data include information about the programs of channels to be broadcast within up to several tens of hours from the current time (for example, program channels, broadcast times, titles, and categories). Because the EPG data are frequently transmitted via a satellite, the demultiplexer 33 creates a sort table from the EPG data stored in the EPG area 34a and stores the created table in an SRAM 52 via the CPU 32.

The MPEG video decoder 36 stores the input digital video signal into a DRAM (Dynamic RAM) 37 to decode the video signal compressed by an MPEG algorithm. The decoded video signal is supplied to an NTSC (National Television System Committee) encoder 38 to be converted into a luminance signal (Y), a chrominance signal (C), and a composite signal of NTSC. The luminance signal and the chrominance signal are amplified by buffer amplifiers 39Y and 39C to be output as an S video signal. The composite signal is amplified by a buffer amplifier 39V.

The MPEG audio decoder 40 stores the input digital audio signal in a DRAM 41 to decode the audio signal compressed by an MPEG algorithm. The decoded audio signal is converted from digital to analog by a D/A (Digital to Analog) converter 42, the left channel audio data signal being amplified by a buffer amplifier 43L to be output while the right channel audio data signal being amplified by a buffer amplifier 43R to be output.

An RF modulator 44 converts the composite signal output from the NTSC encoder 38 and the audio signal output from the D/A converter 42 into an RF signal and outputs the same. In TV (Television) mode, the RF modulator 44 lets the RF signal of NTSC input from an AV device such as a cable box go through to another AV device without change. In the case of set-top box 12, these video and audio signals are supplied to the signal processor 12 of the digital television receiver 4.

The CPU 32 executes various processing operations as instructed by programs stored in a ROM 51, thereby controlling the tuner 61, the QPSK demodulator 62, the error correction circuit 63, and the demultiplexer 33. Also, when an operator button or switch on a front panel 45 is operated by the user, the CPU 32 can accept the input of a predetermined command. Further, when an infrared (IR) signal issued upon operation of a remote commander, not shown, by the user is received by an IR receiver 46 to be input to the CPU 32, the CPU 32 can accept the input of a predetermined command.

A reset button 47 is operated (pressed) by the user when causing the CPU 32 to reset the set-top box 21. The reset button 47 may be arranged on the front panel 45.

A memory controller 48 reads data from the semiconductor memory 23 loaded in the slot 22 and writes data supplied from the CPU 32 to the semiconductor memory 23.

A flash ROM 50 stores data which are required to be retained after the power is turned off (for example, a reception log of the tuner 61, a channel number received immediately before the power is turned off, and the function ID and version ID of software for use in the downloading process to be described later). The ROM 51 stores programs for executing various processing operations and hardware IDs (also called device IDs) for use in the downloading process to be described later.

A modem 53 connects the set-top box 21 to a public switched line network, thereby transmitting data supplied from the CPU 32 to other devices through the public switched line network and capturing data transmitted through the public switched line network into the CPU 32.

The following describes a basic operation of the digital television receiver according to the invention shown in FIG. 1. It should be noted that the following description will be made by use of the flow of a signal received at the parabola antenna 1.

An RF signal output from the LNB 2 of the parabola antenna 1 is demodulated by the tuner 61 of the front end 31 of set-top box 21, QPSK-demodulated by the QPSK demodulator 62, error-corrected by the error correction circuit 63, and supplied to the demultiplexer 33.

The demultiplexer 33 decrypts the encrypted signal of a predetermined broadcast channel supplied from the error correction circuit 63 by use of the key read from the CAM 71 through the card reader interface 35. The decrypted signal is temporally stored in the data buffer memory 34. The demultiplexer 33 reads the data from the data buffer memory 34 as instructed by the CPU 32, outputting the video signal to the MPEG video decoder 36 and the audio signal to the MPEG audio decoder 40.

The digital video signal input in the MPEG video decoder 36 is decoded and the decoded signal is supplied to the NTSC encoder 38 to be converted into a luminance signal, a chrominance signal, and a composite signal based on NTSC. The digital audio signal input in the MPEG audio decoder 40 is decoded and the decoded signal is converted from digital to analog by the D/A converter 42. The composite signal output from the NTSC encoder 38 and the audio signal output from the D/A converter 42 are converted into an RF signal by the RF modulator 44 to be output to the signal processor 12.

The signal processor 12 sends the video and audio signals supplied from the set-top box 21 to the video/audio processor 13. The video/audio processor 13 performs predetermined signal processing on the video signal supplied from the signal processor 12 to output the resultant video signal to the display section 14 for display and performs predetermined signal processing on the audio signal to output the resultant audio signal to the speaker 15 for reproduction.

The following describes a first embodiment of the present invention.

In the first embodiment, when the set-top box 21 is powered on with the semiconductor memory 23 loaded in the slot 22 of the set-top box 21, it is determined whether the software recorded to the semiconductor memory 23 has a predetermined file name and extension which provide a keyword, thereby starting download processing.

Figure 3:
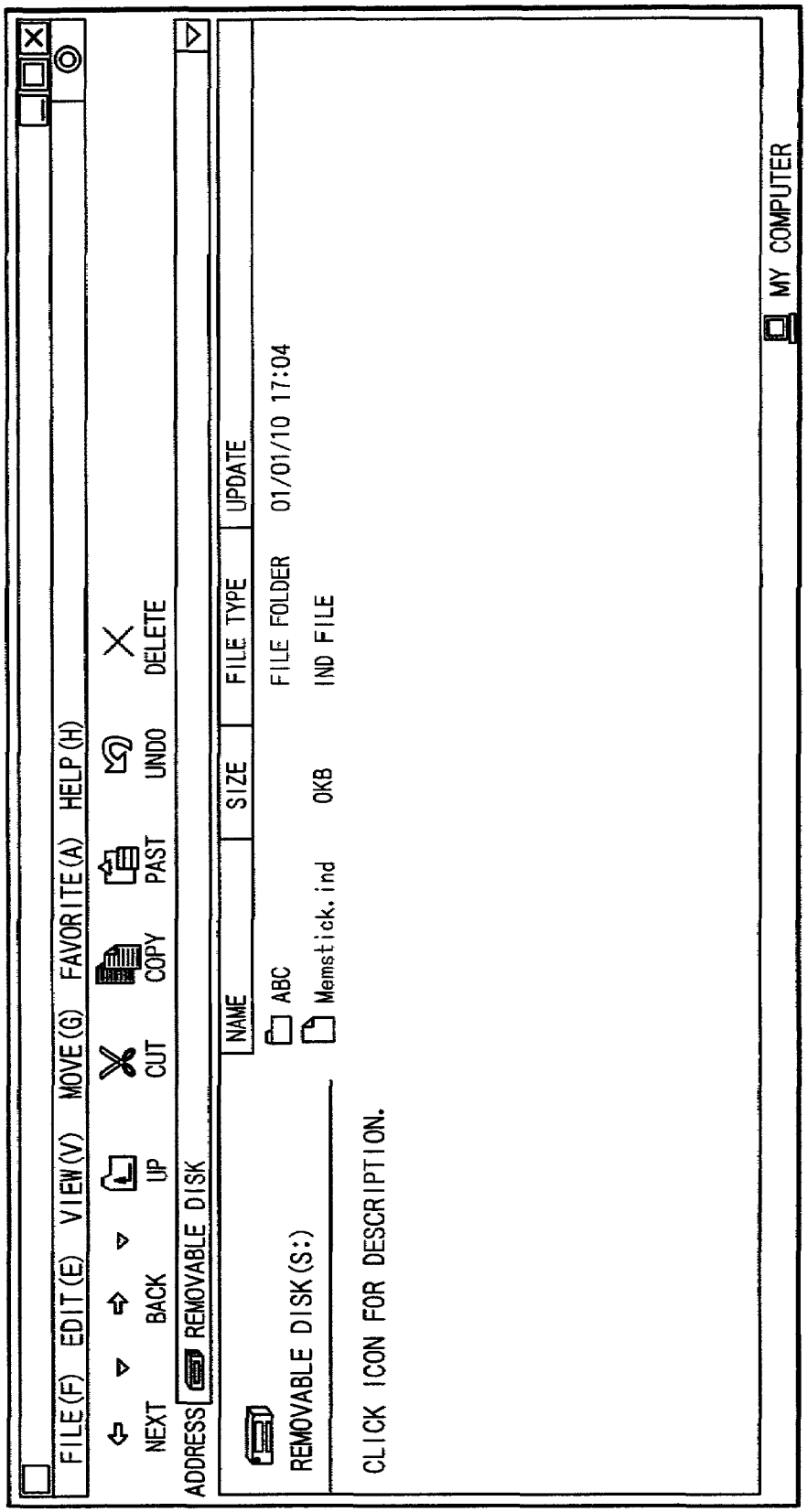
FIG. 3 illustrates an exemplary window display of data recorded to a Memory Stick.

First, referring to FIGS. 3 and 4, a process for recording the software having a predetermined file name and extension to the semiconductor memory 23 will be described.

An engineer of the maker of the software loads the semiconductor memory 23 (to be specific, the Memory Stick) into a slot (not shown) of a personal computer (not shown) to check whether the semiconductor memory 23 has already been formatted. To be more specific, the engineer displays data stored in the semiconductor memory 23 as shown in FIG. 3 and checks to see if a file indicative of the formatting (in the example shown in FIG. 3, file "Memstick.ind") exists.

If this file is found, the engineer creates in the root directory a directory indicative of a location at which the download software (software to be downloaded) is stored. Namely, as shown in FIG. 3, directory "ABC" for storing the download software is created in the root directory of the semiconductor memory 23.

The engineer prepares the download software and, in accordance with a predetermined rule, inputs a file name (for example, "ABC_B1234") and attaches an extension (for example, "DEF") to the software, storing the same at the lower layer of the directory "ABC" created in the root directory of the semiconductor memory 23.

Figure 4:
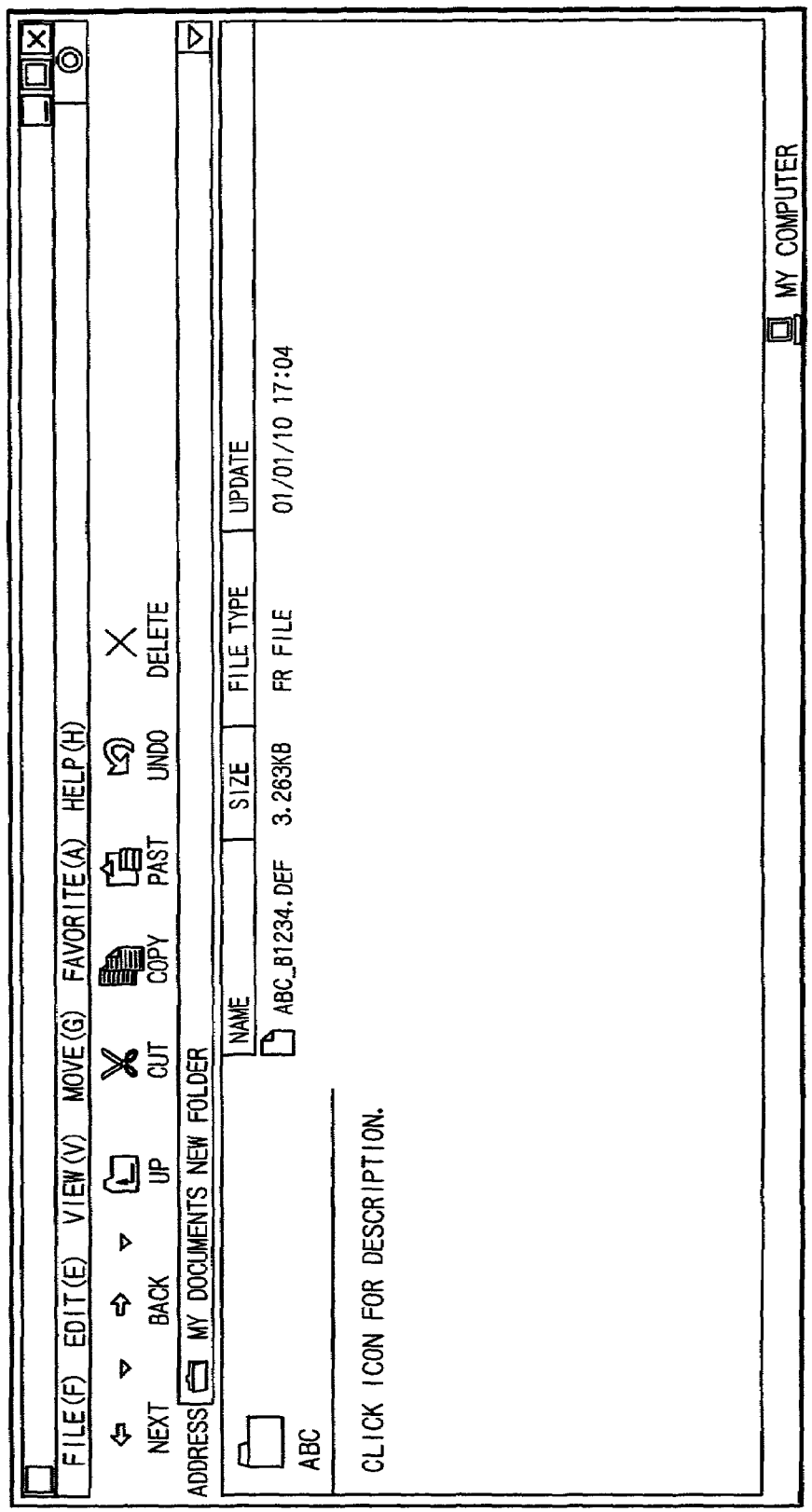
FIG. 4 illustrates another exemplary window display of data stored to the Memory Stick.

FIG. 4 shows a state in which the download software (namely, the file "ABC_B1234.DEF") is stored in the directory "ABC" (the directory for storing the download software).

In the file name "ABC_B1234.DEF" attached to the download software shown in FIG. 4, "ABC" denotes the file name of the download software, the following "B" denotes forced downloading, and the following "1234" denotes the version ID of the software. If the version ID is not preceded with "B," it denotes that this software is downloaded in a non-forced manner.

Figure 5:
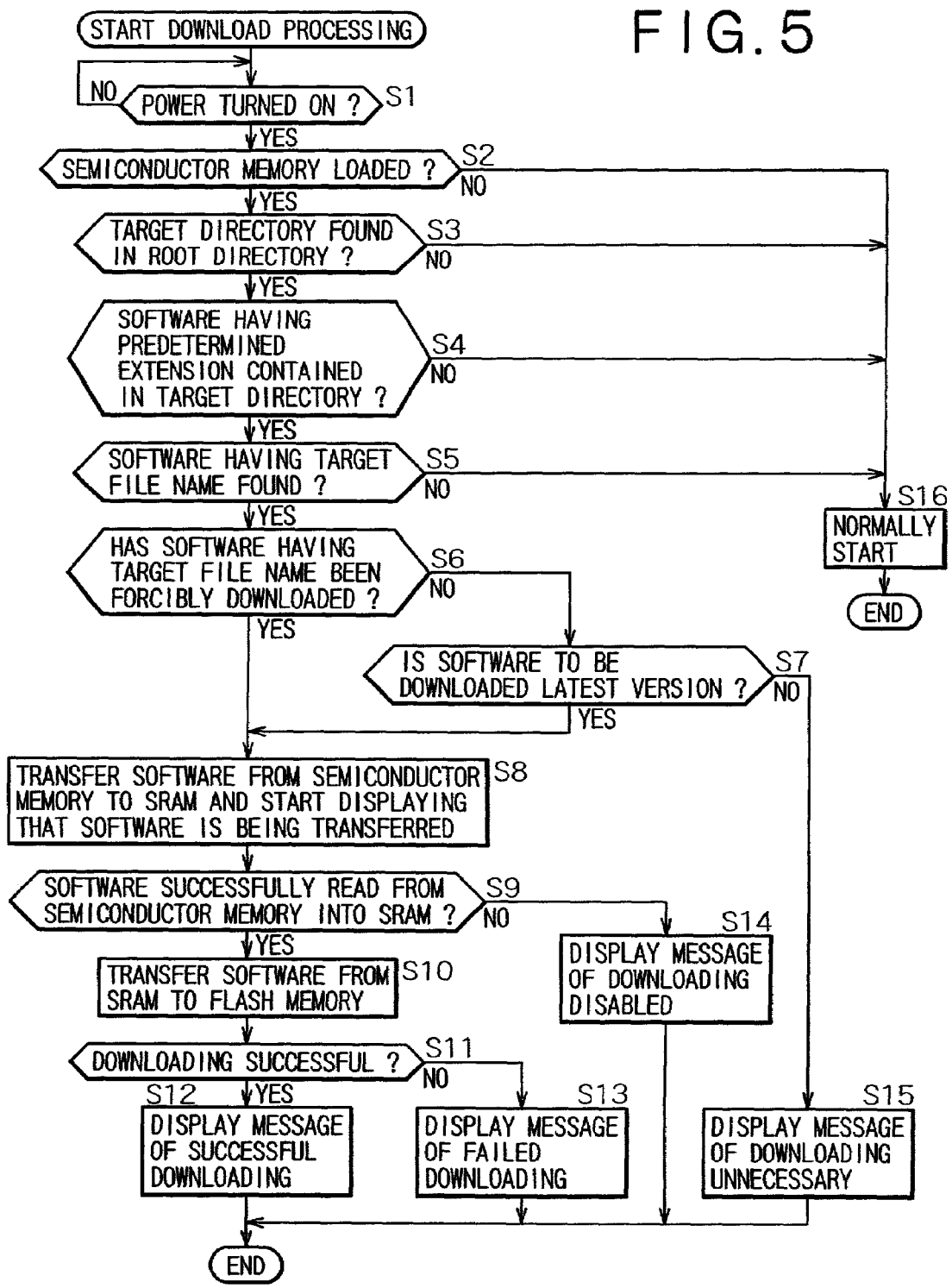
FIG. 5 is a flowchart describing download processing.

The following describes, with reference to the flowchart shown in FIG. 5, the download processing to be performed when the semiconductor memory 23 storing the software as described above is loaded in the set-top box 21.

In step S1, the CPU 32 determines whether or not the power to the main body, not shown, of the set-top box 21, has been turned on by the user and, if the decision is NO, waits until the power is turned on.

If the power is found turned on by the user in step S1, then the procedure goes to step S2, in which the memory controller 48 determines whether the semiconductor memory 23 has been loaded in the slot 22. If the semiconductor memory 23 is found not loaded in the slot 22, then the procedure goes to step S16, in which the CPU 32 executes a start program stored in the ROM 51, thereby normally starting the set-top box 21 without executing the downloading of the software.

If the semiconductor memory 23 is found loaded in the slot 22 in step S2, then the procedure goes to step S3, in which the memory controller 48 reads data from the semiconductor memory 23 loaded in the slot 22 and supplies the data to the CPU 32. The CPU 32 determines from the input data whether the root directory of the semiconductor memory 23 has a target directory (in this example, the directory "ABC" storing the download software).

If the target directory is found in the root directory of the semiconductor memory 23 in step S3, then the procedure goes to step S4, in which the CPU 32 determines whether the target directory includes software having a predetermined extension (in this example, the software having the "DEF" extension).

In step S4, if software having the predetermined extension is found in the target directory, then the procedure goes to step S5, in which the CPU 32 determines whether there is software having a target file name (in this example, the file "ABC_B1234.DEF" or "ABC_1234.DEF"). To be more specific, the CPU 32 determines whether software corresponding to the software stored in the flash ROM 50 is stored in the target directory of semiconductor memory 23.

If software having the target file name is found in step S5, the procedure goes to step S6, in which the CPU 32 determines whether the software having the target file name is for forced downloading. Namely, the CPU 32 determines whether the file name has "B" indicative of forced downloading in front of the version ID.

For example, with the file "ABC_B1234.DEF," there is "B" in front of the version ID "1234," so that this file is for forced downloading.

In step S6, if the software having the target file name is found not to be for forced downloading, then the procedure goes to step S7, in which the CPU 32 compares the version of the software stored in the flash ROM 50 with the version of the download software (stored in the semiconductor memory 23) to see if the software to be downloaded is newer than the software stored in the flash ROM 50.

If the download software is found to be newer in step S7, then the procedure goes to step S8. If, in step S6, the software having the target file name is found to be for forced downloading, then the procedure goes to step S8 by skipping step S7. In this case, the processing of step S8 is executed regardless of the version.

In step S8, the CPU 32 controls the memory controller 48 to read the download software from the semiconductor memory 23 loaded in the slot 22 (in this example, the file "ABC_B1234.DEF") and transfers this software to the SRAM 52. At this moment, the CPU 32 outputs to the display section 14 via the signal processor 12 and the video/audio processor 13 a message indicating that the software is being transmitted from the semiconductor memory 23 to the SRAM 52. Consequently, a message screen "Downloading" as shown in FIG. 6 is displayed on the display section 14.

Figure 6:
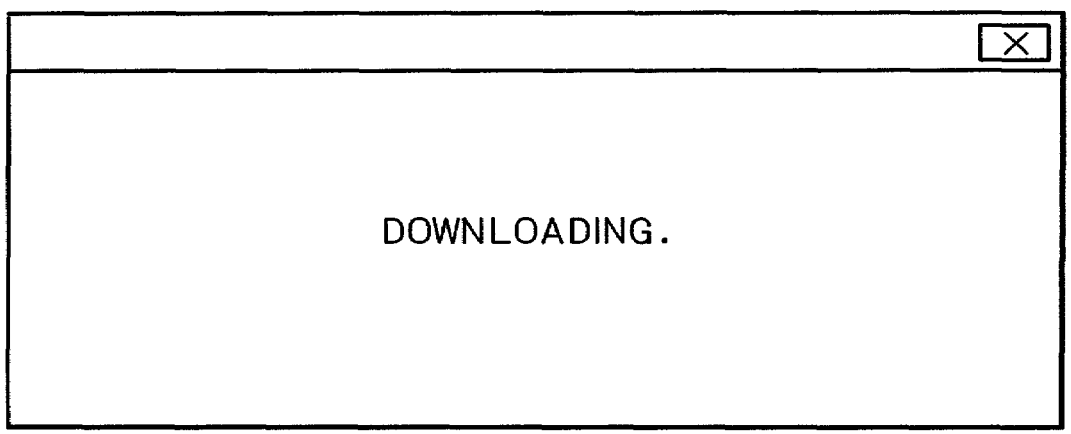
FIG. 6 illustrates an exemplary display of a message screen.

When the transmission of the software from the semiconductor memory 23 to the SRAM 52 has been completed, the CPU 32 ends the displaying of the message screen shown in FIG. 6 and the procedure goes to step S9, in which the CPU 32 determines whether the software transmitted from the semiconductor memory 23 in step S8 has been successfully read into the SRAM 52.

If the software is found in step S9 to have been successfully read into the SRAM 52, then the procedure goes to step S10, in which the CPU 32 reads the software from the SRAM 52 and transfers the software to the flash ROM 50. Consequently, the software downloaded from the semiconductor memory 23 is recorded to (or updated in) the flash ROM 50. In step S11, the CPU 32 determines whether the downloading has been successful, i.e., whether the software read from the SRAM 52 has been correctly stored in the flash ROM 50. If the decision is YES, the procedure goes to step S12.

In step S12, the CPU 32 outputs a message to the display section 14 indicating that the software stored in the semiconductor memory 23 has been successfully downloaded.

Figure 7:
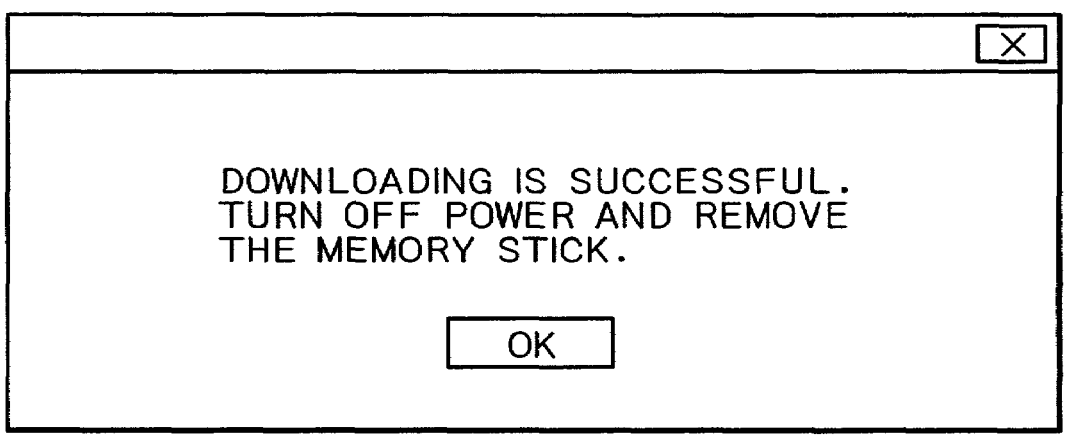
FIG. 7 illustrates an exemplary display of another message screen.

Consequently, the message "Downloading is successful. Turn off power and remove the Memory Stick." as shown in FIG. 7 is displayed.

Checking this message, the user presses an "OK" button, turns off the power of the set-top box 21, and then unloads the semiconductor memory 23 from the slot 22.

Figure 8:
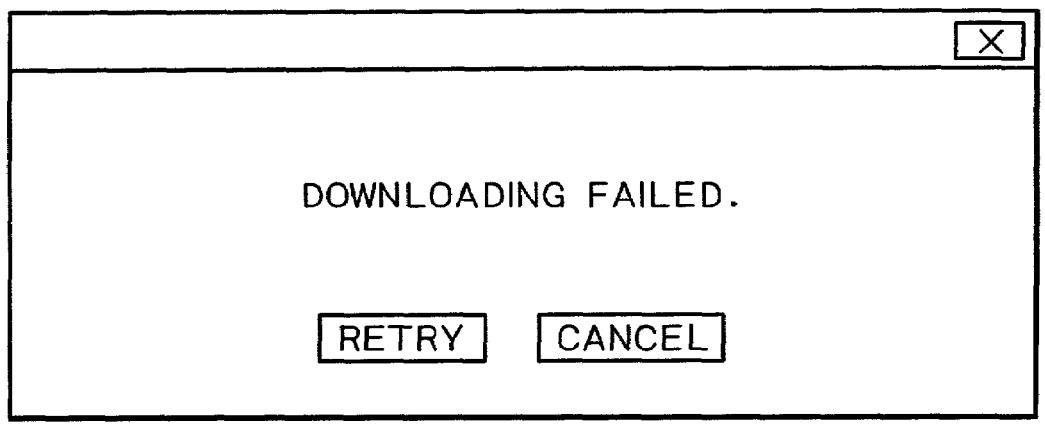
FIG. 8 illustrates an exemplary display of a further message screen.

If the decision is NO, namely, if the software read from the SRAM 52 has not been stored correctly in the flash ROM 50, then the procedure goes to step S13, in which the CPU 32 outputs a message to the display section 14 indicating the failure of the downloading. Consequently, the message "Downloading failed." as shown in FIG. 8 is displayed on the display section 14.

If the user presses a "CANCEL" button on the screen, the downloading is canceled. If the user presses a "RETRY" button shown in FIG. 8, the CPU 32 returns to step S8 to repeat the process.

Figure 9:
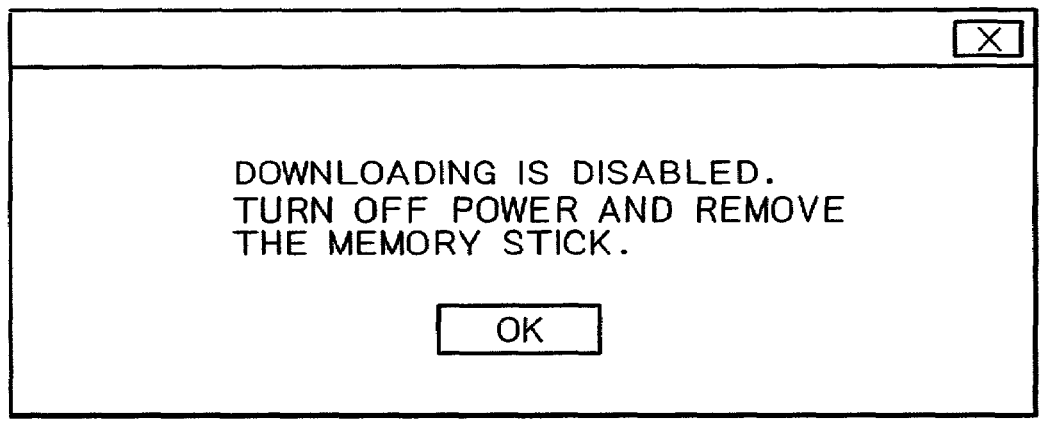
FIG. 9 illustrates an exemplary display of still another message screen.

If the decision is NO in step S9, then the procedure goes to step S14, in which the CPU 32 outputs a message to the display section 14 indicating that the software cannot be downloaded. Consequently, the message "Downloading is disabled. Turn off power and remove the Memory Stick." as shown in FIG. 9 is displayed on the display section 14.

Checking the message, the user presses the "OK" button, turns off the power of the set-top box 21, removes the semiconductor memory 23 from the slot 22, loads the semiconductor memory 23 into the slot 22 again, and turns on the power. Consequently, the above-described process is repeated.

In step S9 again, if the reading of the software from the semiconductor memory 23 into the SRAM 52 has failed, it is possible that the software stored in the semiconductor memory 23 has some trouble, so that the user inquires to the maker of the semiconductor memory 23 and, if necessary, gets a new semiconductor memory 23 and executes the download process with the new semiconductor memory 23.

Figure 10:
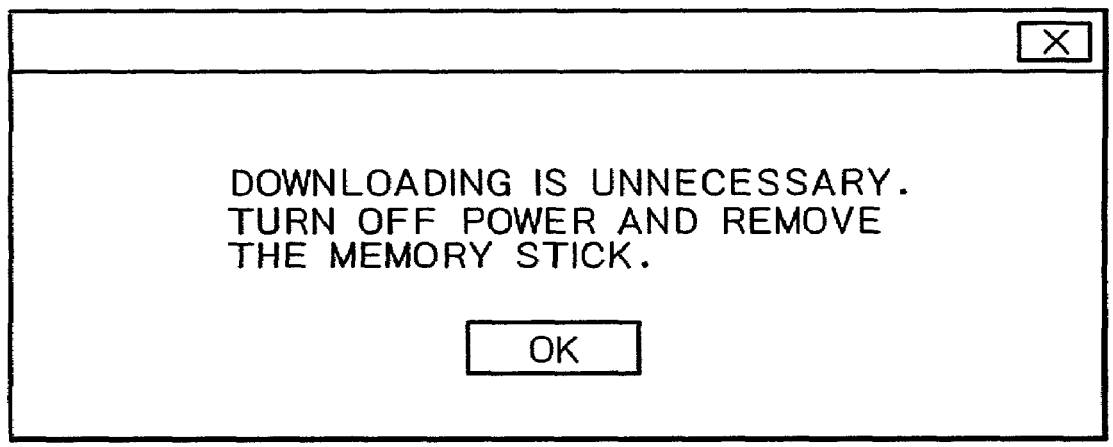
FIG. 10 illustrates an exemplary display of still another message screen.

If, in step S7, the download software (namely, the software stored in the semiconductor memory 23) is found to be not newer than the software stored in the flash ROM 50, then the procedure goes to step S15, in which the CPU 32 outputs a message to the display section 14 indicating that the downloading of the software is not necessary. Consequently, the message "Downloading is unnecessary. Turn off power and remove the Memory Stick." as shown in FIG. 10, for example, is displayed on the display section 14.

Checking this message, the user presses the "OK" button on the screen, turns off the power of the set-top box 21, and removes the semiconductor memory 23 from the slot 22.

If, in step S3, the target directory is not found in the root directory of the semiconductor memory 23; if, in step S4, software having the predetermined extension is not found in the target directory; and if, in step S5, software having the target file name is not found, then the procedure goes to step S16, in which normal start processing is executed (namely, the software already stored is activated).

As described, by determining whether or not software having a predetermined file name and a predetermined extension which provide a keyword is found in the semiconductor memory 23, that software can be downloaded with ease.

The following describes a second embodiment of the present invention.

In the second embodiment, download processing starts when the power to the set-top box 21 is turned on with the semiconductor memory 23 loaded in the slot 22 and it is determined whether or not the software stored in the semiconductor memory 23 has a predetermined hardware ID (a device ID of each individual device) and a predetermined function ID (a software ID) which provides a keyword.

First, a directory structure in the semiconductor memory 23 for use in the second embodiment will be described with reference to FIG. 11.

Figure 11:
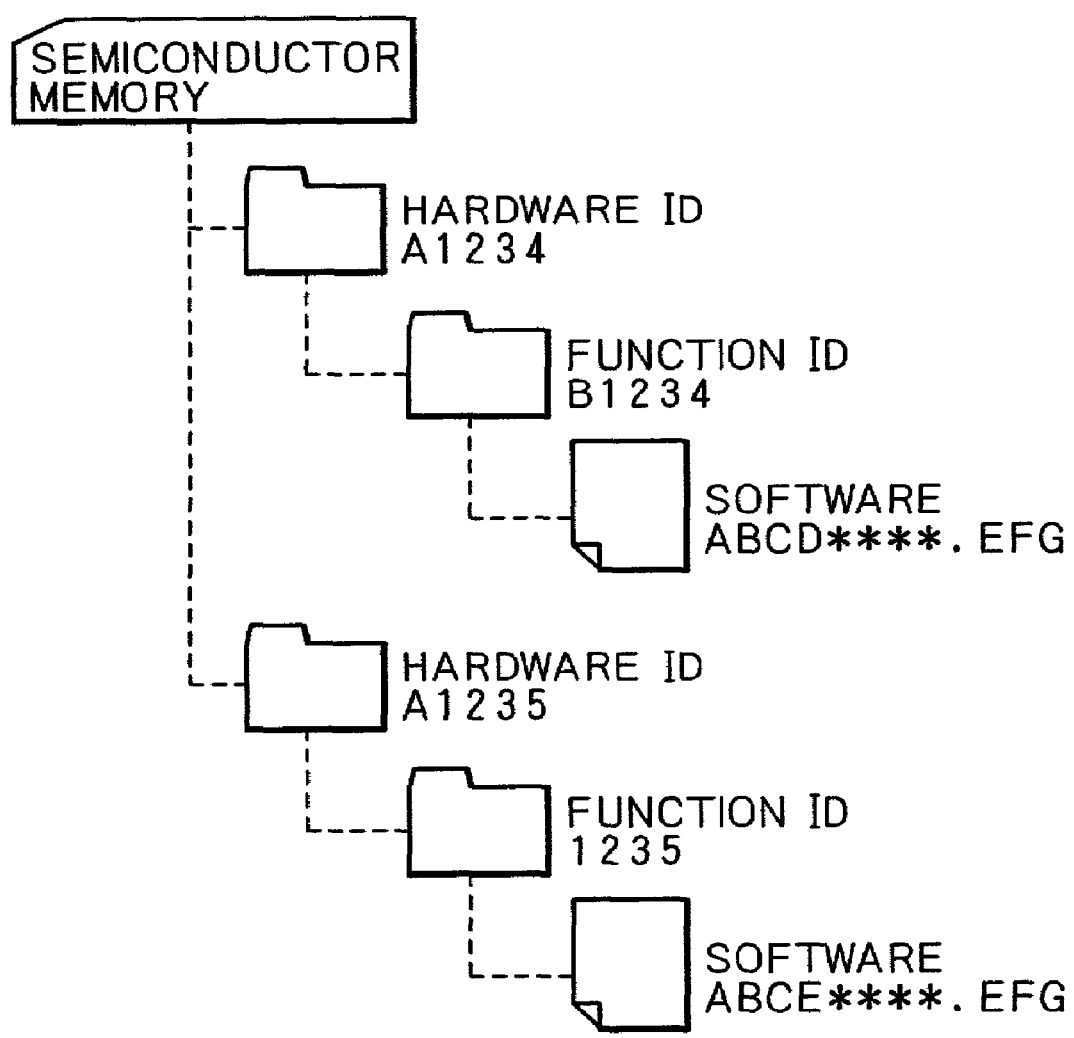
FIG. 11 illustrates a directory structure in a semiconductor memory.

A root directory shown in FIG. 11 has directories having hardware IDs (device IDs). Below each directory having a hardware ID, a directory having a function ID (software ID) as its name is created. Download software is stored in this directory.

Namely, in the example shown in FIG. 11, the function ID directory "B1234" is created below the hardware ID directory "A1234" and the software file "ABCD**.EFG" is stored below this function ID directory. The function ID directory "1235" is created below the hardware ID directory "A1235" and the software file "ABCE**.EFG" is created below this function ID directory.

The following describes the process of recording download software having a predetermined hardware ID and a predetermined function ID to the semiconductor memory 23.

An engineer of the maker of the software loads the semiconductor memory 23 into the slot of the personal computer, checks that the semiconductor memory 23 has already been formatted, creates a directory (for storing predetermined download software) having a hardware ID (for example, "A1234") in the root directory of the semiconductor memory 23, and, below this directory, creates a directory having the function ID (for example, "1234") of the download software. Namely, in the example of FIG. 11, the directory "A1234" is created in the root directory and the directory "1234" is created below directory "A1234."

The engineer prepares the download software, inputs its file name (for example, "ABCD****"), attaches an extension (for example, "EFG") to the file name, and stores the software in the directory "1234" below the directory "A1234" of the semiconductor memory 23. If the software to be stored is for forced downloading, "B" is attached to the beginning (before the function ID) of the directory name of the directory having a function ID, thereby indicating that the software stored in this directory is for forced downloading.

Figure 12:
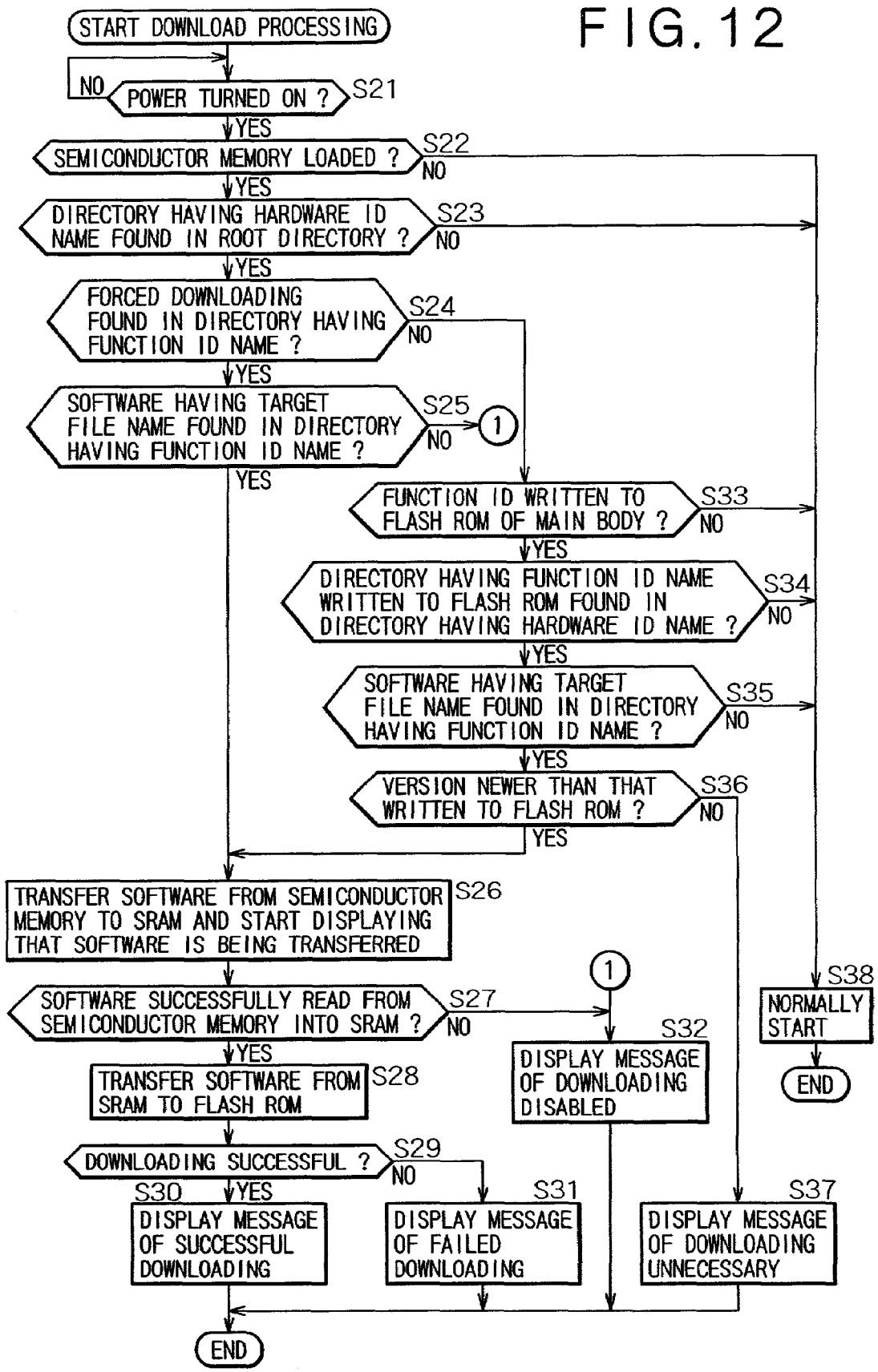
FIG. 12 is a flowchart describing download processing.

The following describes the download processing for downloading the software from the semiconductor memory 23 with reference to the flowchart shown in FIG. 12.

In step S21, the CPU 32 determines whether or not the power to the main body, not shown, of the set-top box 21 has been turned on by the user and, if the decision is NO, waits until the power is turned on. If the power is found to be turned on by the user in step S21, then the procedure goes to step S22, in which the memory controller 48 determines whether the semiconductor memory 23 has been loaded in the slot 22. If the semiconductor memory 23 is found not to be loaded in the slot 22, then the procedure goes to step S38, in which the CPU 32 executes a start program stored in the ROM 51, thereby normally starting the set-top box 21.

If the semiconductor memory 23 is found to be loaded in the slot 22 in step S22, then the procedure goes to step S23, in which the memory controller 48 reads data from the semiconductor memory 23 loaded in the slot 22 and supplies the data to the CPU 32. The CPU 32 determines from the input data whether the root directory of the semiconductor memory 23 has a directory having a hardware ID as its name.

If the directory having a hardware ID as its name is found in the root directory of the semiconductor memory 23 in step S23, then the procedure goes to step S24, in which the CPU 32 determines whether there is any directory having a function ID as its name which indicates forced downloading below the directory having the hardware ID as its name. Namely, the CPU 32 determines whether there is any directory name prefixed with "B."

If no directory name indicative of forced downloading is found in step S24 in the directory having the function ID as its name below the directory having the hardware ID as its name, then the procedure goes to step S33, in which the CPU 32 determines whether the function ID (the function ID of the set-top box 21) is stored in flash ROM 50.

If the function ID is found to be written to the flash ROM 50 in step S33, then the procedure goes to step S34, in which the CPU 32 determines whether the semiconductor memory has a directory having the function ID written to the flash ROM 50 as its name recorded below the directory having the hardware ID as its name.

If, in step S34, a directory having the function ID written to the flash ROM 50 as its name is found below the directory having the hardware ID written to the semiconductor memory 23 as its name, then the procedure goes to step S35, in which the CPU 32 determines whether software having a target file name is stored in the directory having the function ID as its name. To be more specific, the CPU 32 determines whether there is software in the directory having the function ID of the semiconductor memory 23 which corresponds to the software written to the flash ROM 50.

If, in step S35, software having the target file name is found in the directory having the function ID, then the procedure goes to step S36, in which the CPU 32 compares the software written to the flash ROM 50 with the software to be downloaded (written to the semiconductor memory 23), thereby determining whether the version of the download software is newer than the software written to flash ROM 50.

If, in step S36, the download software is found to be newer than the software written to the flash ROM 50, then the procedure goes to step S26.

If, in step S24, software to be forcibly downloaded is found in the directory having the function ID as its name below the directory having the hardware ID as its name, then the procedure goes to step S25, in which the CPU 32 determines whether software having a target file name exists in the directory having the name indicative of forced downloading.

If, in step S25, software having the target file name is found in the directory having the name indicative of forced downloading, then the procedure goes to step S26.

In step S26, the CPU 32 controls the memory controller 48 to read the download software from the semiconductor memory 23 loaded in the slot 22 and transfers the software to the SRAM 52. At this moment, the CPU 32 outputs to the display section 14 via the signal processor 12 and the video/audio processor 13 a message indicating that the software is being transmitted from the semiconductor memory 23 to the SRAM 52 (FIG. 6).

When the transmission of the software from the semiconductor memory 23 to the SRAM 52 has been completed, the procedure goes to step S27, in which the CPU 32 determines whether the software transmitted from the semiconductor memory 23 in step S26 has been successfully read into the SRAM 52. If the decision is YES, the procedure goes to step S28.

In step S28, the CPU 32 reads the software stored in the SRAM 52 in step S26 and transmits this software to the flash ROM 50. Consequently, the software downloaded from the semiconductor memory 23 is stored (or updated) in the flash ROM 50. Then, in step S29, the CPU 32 determines whether or not the software read from the SRAM 52 has been correctly stored in the flash ROM 50. If the decision is YES, the procedure goes to step S30.

In step S30, the CPU 32 outputs a message to the display section 14 indicating that the downloading of the software from the semiconductor memory 23 has been successful.

If the downloading is found to have failed in step S29, namely, the software read from the SRAM 52 has not been correctly stored in the flash ROM 50, then the procedure goes to step S31, in which the CPU 32 outputs a message as shown in FIG. 8 to the display section 14, indicating the failure of the downloading. If the "RETRY" button on the screen is pressed, the CPU 32 returns to step S26 to repeat the above-mentioned process.

If, in step S27, the software read from the semiconductor memory 23 is found to have been read incorrectly into the SRAM 52, then the procedure goes to step S32, in which the CPU 32 outputs a message to the display section 14 indicating that the software cannot be downloaded. If, in step S25, software having the target file name is not found below the directory having the name indicating forced downloading, then the procedure goes to step S32, in which the CPU 32 outputs the message shown in FIG. 9 to the display section 14.

If, in step S36, the software to be downloaded (stored in the semiconductor memory 23) is found not to be newer in version than the software written to the flash ROM 50, then the procedure goes to step S37, in which the CPU 32 outputs the message shown in FIG. 10 to the display section 14, indicating that the downloading is unnecessary.

If, in step S23, a directory having the hardware ID is not found in the root directory of the semiconductor memory 23; if, in step S33, no function ID is found written to the flash ROM 50; if, in step S34, a directory having the function ID written to flash ROM 50 is not found below the directory having the hardware ID written to the semiconductor memory 23; and, if, in step S35, software having the target file name is not found in the directory having the function ID as its name, then the procedure goes to step S38, in which normal start processing is executed.

As described and according to the invention, by determining whether or not the software to be downloaded is found in the directory having a predetermined hardware ID, and a function ID which provide a keyword in the semiconductor memory 23, the software can be downloaded without failure as required.

Furthermore, a plurality of directories having function IDs as their names are created below a directory having a hardware ID and download software is stored in each of the plurality of directories. Consequently, two or more different software programs can be downloaded at a time.

Additionally, if the software to be forcibly downloaded is stored in the semiconductor memory 23, this software can be downloaded regardless of its version, so that the version of this software can be upgraded or downgraded.

Furthermore, whether or not to download software from the semiconductor memory 23 can be determined before the software is read into the SRAM 52. Consequently, if the downloading is unnecessary or disabled, the normal program start mode can be promptly resumed.

In the above-mentioned embodiments, the downloading of software is performed by use of a semiconductor memory (Memory Stick), but the present invention is not limited thereto. The downloading can also be effected by use of other kinds of storage media.

In the above-mentioned embodiments, the messages indicative of success or failure of downloading, for example, are displayed on the display section 14, but the present invention is not limited thereto. These messages may also be indicated by the number of times a LED (Light Emitting Diode) flashes or by the number of LEDs which are on. For example, if the software to be downloaded is stored in the semiconductor memory 23, two LEDs may be turned on, if the software has been successfully downloaded, three LEDs may be turned on, and, if the downloading has failed, four LEDs may be turned on, thereby informing the user of the state of the downloading.

In the above-mentioned embodiments, the present invention is applied to the set-top box 21, but the present invention is not limited thereto. The present invention may also be widely applied to various devices which have a slot into which the semiconductor memory 23 can be loaded. For example, if the present invention is applied to a personal computer 101, its configuration may be as shown in FIG. 13.

In the personal computer 101, a CPU 111 executes various processing operations as instructed by programs stored in a ROM 112 and a storage section 119. The ROM 112 stores hardware IDs in addition to programs for executing various processing operations. A RAM 113 stores programs and data necessary for the CPU 111 to execute various processing operations. A flash ROM 114 stores function IDs and version IDs. The CPU 111, the ROM 112, the RAM 113, and the flash ROM 114 are interconnected with each other via a bus 115 and are also connected to an input/output interface 116.

The input/output interface 116 is connected to an input section 117 composed of a keyboard and a mouse, for example; an output section 118 composed of an LCD (Liquid Crystal Display), a CRT (Cathode Ray Tube), and a speaker, for example; a storage section 119 constituted by a hard disk, for example; a communication section 120 for providing communication with a public switched line network; and a slot 121 for accommodating a semiconductor memory 23.

The input/output interface 116 is also connected to a drive 122 for installing programs, into which a magnetic disk 131, an optical disk 132, or a magneto-optical disk 133, for example, is loaded as required. The above-mentioned process is executed by the CPU 111 as instructed by programs (or software).

The above-mentioned sequence of processing operations may also be executed by software. This software is installed in a computer in which the programs constituting this software are installed in a dedicated hardware component or a general-purpose personal computer which can execute various functions by installing corresponding programs from a recording medium.

This recording medium is constituted by a package medium which is the magnetic disk (including floppy disk), the optical disk 132 (including CD-ROM (Compact Disk Read Only Memory) and DVD (Digital Versatile Disk)), the magneto-optical disk (including MD (MiniDisc)), or the semiconductor memory 23, each being recorded with programs and distributed independently of computers.

It should be noted that herein the steps describing a program recorded on a recording medium include not only the process to be executed in a time-series manner in accordance with the described sequence, but also the process which is executed in parallel or discretely, not always in a time-series manner.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for processing information in an information processing apparatus into which specified software is downloaded from a storage medium, comprising:
   determining whether a root directory in the storage medium includes a first directory having a hardware identifier as its name;
   determining, if the first directory exists in the storage medium, whether the storage medium includes a second directory under the first directory, the second directory having a name which indicates a function identifier of the specified software and which is associated with the hardware identifier of the first directory;
   determining whether the specified software exists under the second directory;
   determining whether the specified software is for forced downloading according to an identifier thereof; and
   downloading the specified software from the storage medium if the specified software exists under the second directory;
   wherein, if the specified software is for forced downloading, the specified software is downloaded regardless of a version thereof.

2. The method of claim 1, further comprising determining whether the name of the second directory indicates forced downloading of the specified software.

3. A storage medium storing a computer-readable program for controlling an information processing apparatus into which specified software is downloaded from a storage medium, the program comprising:
   determining whether a root directory in the storage medium includes a first directory having a hardware identifier as its name;
   determining, if the first directory exists in the storage medium, whether the storage medium includes a second directory under the first directory, the second directory having a name which indicates a function identifier of the specified software and which is associated with the hardware identifier of the first directory;
   determining whether the specified software exists under the second directory;
   determining whether the specified software is for forced downloading according to an identifier thereof; and
   downloading the specified software from the storage medium if the specified software exists under the second directory;
   wherein, if the specified software is for forced downloading, the specified software is downloaded regardless of a version thereof.

4. An information processing system comprising a processor and software adapted to run on the processor for causing a computer into which specified software is downloaded from a storage medium to execute the program, the program comprising:
   determining whether a root directory in the storage medium includes a first directory having a hardware identifier as its name;
   determining, if the first directory exists in the storage medium, whether the storage medium includes a second directory under the first directory, the second directory having a name which indicates a function identifier of the specified software and which is associated with the hardware identifier of the first directory;

determining whether the specified software exists under the second directory;

determining whether the specified software is for forced downloading according to an identifier thereof; and downloading the specified software from the storage medium if the specified software exists under the second directory;

wherein, if the specified software is for forced downloading, the specified software is downloaded regardless of a version thereof.

5. A storage medium having information stored thereon for use by an information processing apparatus, the information comprising:

a root directory including a first directory having a hardware identifier as its name;

a second directory under the first directory; and specified software stored under the second directory using a name and a predetermined extension attached to the name, the second directory having a name which indicates a function identifier of the specified software and which is associated with the hardware identifier of the first directory;

wherein, if the specified software is for forced downloading according to an identifier thereof, the specified software is downloaded to the information processing apparatus regardless of a version of the specified software.

6. The storage medium according to claim 5, wherein the storage medium is a rewritable memory.

7. An information processing apparatus into which specified software is downloaded from a storage medium, comprising:

a storage receptacle adapted to receive the storage medium;

a first determination unit operable to determine whether a first directory exists in the storage medium, the first directory having a name indicating a hardware identifier of said information processing apparatus, to determine, if said first directory exists in the storage medium, whether a second directory exists under said first directory, said second directory having a name which indicates a function identifier of the specified software and which is associated with the hardware identifier of said first directory, to determine, if said second directory exists under said first directory, whether the specified software exists under said second directory, and to determine whether the specified software is for forced downloading according to an identifier thereof; and an execution unit operable to download the specified software from the storage medium if the specified software exists under said second directory, and, if the specified software is for forced downloading, the specified software is downloaded regardless of a version thereof.

8. The information processing apparatus according to claim 7, further comprising:

a second determination unit operable to determine whether the storage medium is loaded in the storage receptacle of said information processing apparatus.

9. The information processing apparatus according to claim 7, further comprising:

a controller operable to activate different software previously stored in said information processing apparatus if said first directory does not exist in the storage medium, if said second directory does not exist under said first directory, or if the specified software does not exist under said second directory.

10. The information processing apparatus according to claim 7, wherein said first determination unit is further operable to determine whether the specified software is for forced downloading.

11. The information processing apparatus according to claim 10, further comprising:

a checking unit operable to check said version of the specified software if the specified software is not for forced downloading.

12. The information processing apparatus according to claim 11, wherein, if said version of the specified software is newer than a version of previously stored corresponding software, said execution unit downloads the specified software.

13. The information processing apparatus according to claim 11, wherein, if said version of the specified software is not newer than a version of previously stored corresponding software, a message is displayed indicating that the specified software need not be downloaded.

14. The information processing apparatus according to claim 7, further comprising:

a checking unit operable to check said version of the specified software if the specified software exists under said second directory.

15. The information processing apparatus according to claim 7, further comprising:

a second determination unit operable to determine whether the specified software has been downloaded successfully; and a display controller operable to display a message based on a result of the determination by said second determination unit.

16. The information processing apparatus according to claim 7, wherein, if other software corresponding to the specified software previously has been stored in said information processing apparatus, said execution unit rewrites said other software with the specified software.

17. The information processing apparatus according to claim 7, wherein the storage medium is a rewritable memory.

* * * * *